Jan. 21, 1958  M. R. J. WYLLIE  2,820,756
ION-EXCHANGE MEMBRANES
Filed Dec. 29, 1953
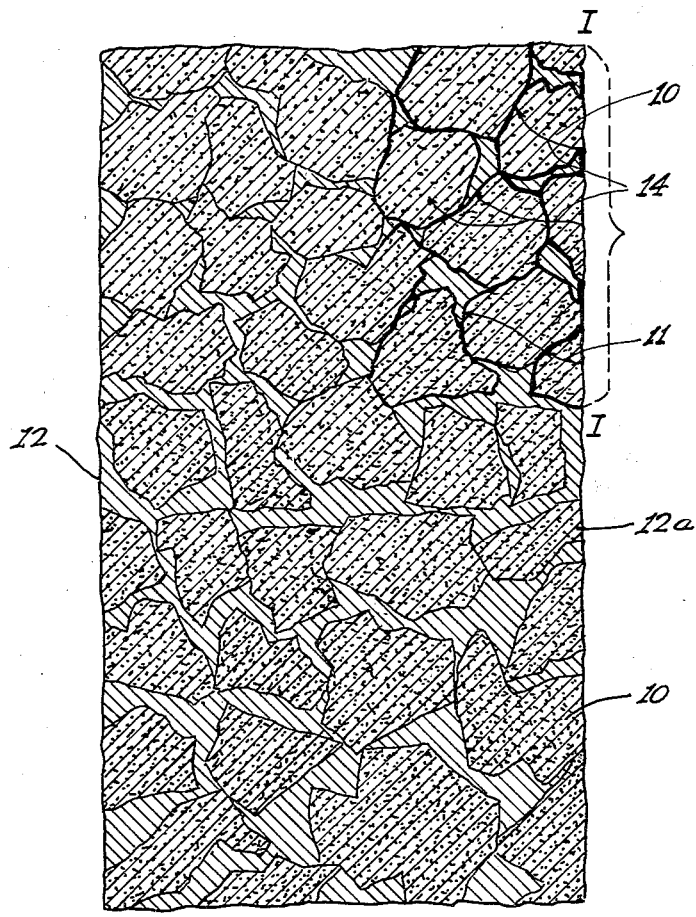
INVENTOR.
Malcolm R. J. Wyllie.
BY
ATTORNEY:-

2,820,756
ION-EXCHANGE MEMBRANES

Malcolm R. J. Wyllie, Indiana Township, Allegheny County, Pa., assignor to Gulf Research & Development Company, Pittsburgh, Pa., a corporation of Delaware Application December 29, 1953, Serial No. 400,994

9 Claims. (Cl. 204—296)

This invention relates to bonded ion-exchange membranes and to an improved method for their preparation, and has more specific reference to bonded ion exchange membranes having improved electrical conductivity characteristics.

Ion-exchange membranes have been found to be useful in the determination of the ion concentration of electrolytes and in electrodialysis processes; in the latter the membranes act as permselective barriers to the transfer of ions in the electrolytes to opposing electrodes of electrodialytic cells. In the past these ion-exchange membranes have been formed as homogeneous sheets of an ion-exchange resin. The practicability of homogeneous membranes of this type has been limited by their lack of physical strength, their breaking up or drying out, etc. Ion-exchange resins have also been prepared by chemical treatment of synthetic resins in the form of sheets. If the membranes have been formed by this treatment, an impermeable barrier containing no exchange groups will remain between surfaces of the membrane unless the treatment is so drastic as to destroy substantially the entire structure of the membrane.

These difficulties have to a substantial extent been overcome by the provision of heterogeneous ion-exchange membranes in which particles of ion-exchange material are disseminated in an inert binding material which contributes strength and stability to the membranes, as illustrated by U. S. Patent No. 2,614,976, issued October 21, 1952, to Patnode and Wyllie. An improved bonded ion-exchange membrane is disclosed and claimed in my co-pending application S. N. 309,760, filed September 16, 1952, in which the ion-exchange particles are retained in a mutually contacting arrangement in the matrix so as to provide an improved path for the passage of ions through the permselective barrier and, hence, an improved conductivity.

Briefly stated, this invention comprises an improved heterogeneous ion-exchange membrane consisting of water-insoluble ion-exchange particles disseminated in an electrolytically non-conductive binding material that has been treated with a reagent to impose dissociable groups that are capable of exchanging ions and are fixed to the surfaces of the bonding material, and comprehends also the method of its preparation. The preformed heterogeneous ion-exchange membrane, which is treated with the said reagent, will contain from 30 to 80 percent, by weight, of finely divided ion-exchange material distributed substantially uniformly throughout a matrix of bonding resin. The reagent imposes ion-exchange groups on the exposed surfaces of the plastic matrix in accordance with known chemical reactions between the reagent and the plastic. The reagent will penetrate pores in the ion-exchange material and form dissociable exchange groups at the interfaces between the bonding plastic and ion exchange material. The invention is applicable to both bonded heterogeneous anion-exchange membranes and heterogeneous cation-exchange membranes and further contemplates treatment of the binding material with a reagent which will introduce upon the interfaces respectively anion or cation-exchange groups so that the treated membrane will contain a higher concentration of said groups. In one embodiment of the invention the bonded membrane is treated with a reagent such that the imposed ion-exchange groups will be substantially identical in chemical nature to the ion-exchange groups of the bonded ion-exchange material. For example, where the heterogeneous membrane comprises a sulfonated synthetic resin disseminated in an electrodialytically inert bonding resin the membrane is treated with a sulfonating agent so that ion-exchange groups of substantially the same nature as those carried by the disseminated ion-exchange material will be imposed on the bonding resin.

An important aspect of my invention is resident in the fact that heterogeneous membranes are treated under conditions such that the interfaces and exterior surfaces only of the bonding material will be converted. More intensive treatment which could result in the destruction of the membrane is avoided and is unnecessary to provide membranes of high conductivity. A notable distinction appears here from treatment of homogeneous membranes since the bonded heterogeneous membrane before treatment contains a body of permselective material so that substantial increase in conductivity in the membrane can be obtained by very slight treatment only of the exterior surfaces of the membrane. Thus the strength or stability of the ion-exchange membrane is not substantially affected.

In the accompanying drawing which is supplied for the purpose of illustrating an embodiment of the invention, the single figure is an enlarged cross section of a concatinated heterogeneous bonded ion-exchange membrane.

Referring now to the drawing, particles 10 constitute ion-exchange particles which are distributed throughout bonding resin 11 that constitutes a matrix holding the particles 10 in contact with each other. As illustrated in the drawing, the particles 10 are aligned in mutual contact by the improved method disclosed and claimed in my copending application S. N. 309,760. Surfaces 12 and 12a of the membrane contain relatively large areas in which the bonding resin completely covers and insulates ion-exchange particles.

As shown in the drawing the surfaces 12 and 12a of the membrane are flat and any ion-exchange particles extending beyond the surface of the membrane have been made level with the membrane surface by polishing, grinding, or the like. Treatment with a reagent that will form exchange groups on surfaces of the binding matrix 11 will also penetrate the relatively porous ion-exchange particles 10 as shown by the small arrows 14 and will react with the matrix plastic at interfaces of the ion exchange particles and the plastic. Thus the surface of the ion-exchange membranes will be converted to a conducting medium and in addition matrix plastic which fills the spaces between ion-exchange particles will to some degree be converted to ion-exchange material. Thin insulating films of bonding plastic will probably exist between ion-exchange particles in heterogeneous membranes even when the particles are pressed tightly together in the manufacture of the membranes. Without limiting my invention to any particular theory of operation, it is suggested, as an explanation of the remarkable effect of my process in reducing resistivity of the membranes, that it is the conversion of these thin films which so reduces the said resistivity. The so-treated thin films of bonding plastic are shown in black in one section, along surface 12a, of the drawing, as indicated by the bracket I—I′, in order to demonstrate the manner in which the conductivity of the membrane is increased by the treatment of the invention. Contiguous particles of ion-exchange material, which may, prior to treatment, be in conductive contact at only a few points, will be in electrical contact over substantially entirely their contiguous surfaces.

Heterogeneous bonded ion-exchange membranes can contain a naturally occurring ion-exchange reactive material, such as the zeolites or glauconite, or a synthetic ion-exchange resin. The ion-exchange material can be either an anion- or a cation-premeable resin, the former including for example, melamine-guanidine formaldehyde, urea-guanidine formaldehyde, aminated chloroalkylated copolymer of a monovinyl and divinyl aromatic hydrocarbon and a caustic-oxidized cellulosic membrane impregnated with a protamine sulfite; and the latter including phenol sulfonic acid formaldehyde resin, a mineral acid treated polystyrene, and a carboxylic acid treated polystyrene in the hydrogen form.

The plastic bonding material, which can include pitches, rubbers, and synthetic resins, can be treated in various ways to impose ion reactive groups thereon, and will comprise from 20 to 70 percent by weight of the membrane.

Numerous methods are available to produce on the surface of the bonding material of bonded ion-exchange membranes dissociable groups of an ion-exchange nature. These methods are not necessarily equivalent inasmuch as they individually call for different reaction times, temperatures and concentrations of reactant to provide an optimum degree of treatment of the bond. The several methods are, furthermore, each peculiarly suitable for the treatment of selected bonded ion-exchange membranes since the type of bonding plastic will govern the type of reagent which should be employed, and since it will usually be desirable to form a chemical group of that ion-exchange nature which is most appropriate to the ion-exchange material of the treated membrane. In general it will be preferred to impose on the bonding plastic ion-exchange groups that are similar to or identical with the ion-exchange groups of the bonded ion-exchange material; thus bonded membranes of different types will call for different treatment.

Some of the methods of imposing ion-exchange groups on a bonding resin are summarized in the following paragraphs. In the following paragraphs, reference is had to treatment of specific resins, including polystyrene and methyl methacrylate resins. As is well understood in the art, polystyrene resins and methacrylate resins are derived from monomeric materials having the general molecular structure: $CH_2=C<$. Thus, styrene monomer has the formula:

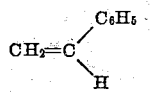

and methyl methacrylate has the formula:

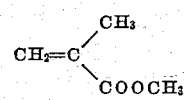

As a result, polymers derived from the foregoing monomers are characterized, respectively, by a plurality of recurring phenyl substituents and a plurality of recurring esterified carboxyl groups.

A cation-exchange membrane which consists of a phenolic methylene sulfonic cation-exchange resin bonded in a polystyrene matrix can be treated with fuming sulfuric acid or chlorosulfonic acid for a period between about 2 minutes and 30 minutes, to sulfonate the polystyrene and to impose sulfo groups on the recurring phenyl substituents thereof in accordance with known chemical principles. The dissociable ion in this instance will be the hydrogen ion of the sulfo group. The acid diffuses into the cation-exchange resin and reacts with the polystyrene both on the surface of the membrane and at the interface between the exchange resin and the polystyrene.

As another example of treatment of a cation exchange membrane, a membrane consisting of a cation exchange resin bonded with a methyl methacrylate polymer is heated in an alcoholic solution of potassium hydroxide to form a polyacrylic acid with carboxyl groups having cation-exchange properties. The foregoing treatment, as is well understood, involves hydrolysis of surficial methacrylic acid ester groups by means of an alkali metal base. In this case the resinous, recurring ester groups are converted to resinous acyloxy groups that are associated with dissociable hydrogen ions.

Anion-exchange groups can be formed on the surface of a polystyrene bond to conform to an anion exchange resin bonded in the polystyrene by first treating the anion-exchange membrane with nitric acid. Nitro groups are formed on the surface of the polystyrene. This particular method is suitable also when other vinyl aromatic resins are employed. The nitro groups are then reduced by treating with solutions of titanium trichloride or stannous chloride in hydrochloric acid to form amine groups. The resultant resinous, substituted amines have ion-exchange properties, by virtue of their tendency to associate with water and form substituted ammonium hydroxides, as is known, and will selectively increase the conductivity of the treated ion-exchange membranes. The dissociable ion here will be the hydroxyl ion.

Another treatment can be employed in which the water of the heterogeneous ion-exchange membrane is first replaced by absolute alcohol and in which the nitro groups subsequently or previously formed on the surfaces of the bond are reduced by sodium in absolute alcohol. As will be apparent, the resultant material in this case will be analogous to that described in the preceding paragraph.

Another method of producing anion-exchange groups on the surface of a heterogeneous anion-exchange membrane is also especially adapted to membranes wherein the bonding plastic is a vinyl aromatic resin. The bonded membrane is first treated with a polyhalo hydrocarbon containing 2 to 3 carbon atoms such as perchloroethylene and then a halo methylating agent such as chloromethylether in the presence of a catalyst such as zinc chloride. The bonding material of the membrane is then treated with dimethyl ethanolamine at a temperature below that at which the membrane would be impaired in mechanical or physical properties to form amine groups on the surface of the bonding resin.

Bonded anion-exchange resins can also be treated with a mixture of paraformaldehyde and hydrochloric acid, a dihaloalkane and aluminum chloride, or a halo ether and aluminum chloride to halo-alkylate the membrane. The halo-alkylated membrane is then reacted with an amine which can include primary, secondary or tertiary amines such as methyl, dimethyl, and trimethyl amine, diethylene triamine, triethylene tetramine and tetraethylene pentamine. In this instance, as in that described in the preceding paragraph, the surficial recurrent substituents are converted to quaternary ammonium groups having associated therewith dissociable salt-forming halide ions.

In another method of operation a polystyrene bonded anion-exchange membrane is treated under reflux with nitric and sulfuric acids, is water washed and reduced with stannous chloride, to convert the nitro groups to amino groups. The membrane is then washed with sodium hydroxide, to convert the amino groups to substituted ammonium groups having dissociable hydroxyl groups associated therewith. The membrane is subjected to the mixed acids at reflux temperatures for a period of not more than about 20 to 40 minutes.

Thus many methods are known to the art for treating plastics and forming on their surfaces ion exchange groups. These methods are adaptable to treating bonded ion-exchange membranes according to the method of the present invention but care should be taken to avoid excessive treatment and a weakening of the membrane. Therefore known processes of treating plastics to impose ion-exchange groups are modified with respect to one or more of the factors' time, temperature and reactant concentration to prevent excessive reaction with the bonding plastic and especially to avoid deleterious reaction of the ion-exchange resin with the reactant. Experimentation with selected heterogeneous ion-exchange membranes at different temperatures and concentrations of reactant will indicate the proper time and temperature to be employed. Some physical attack by the treating reactants will be observed and will constitute solely a slight scaling of the surface of the membranes. This causes no substantial weakening of the membrane and is an easily observable index to the permissible degree of treatment that can be employed.

In a specific example illustrating the process of my invention, a sulfonated polystyrene cation-exchange resin in hydrogen form and having an 8 percent nominal divinyl benzene cross-linking was mixed with polystyrene and the mixture was molded at 1000 p. s. i. and 100° C. and subsequently at 5200 p. s. i. and 100 to 205° C. to form heterogeneous cation-exchange membranes. The membranes were formed in the manner described in U. S. Patent 2,614,976, and under conditions such that membranes of relatively high resistivity would be formed in order to show more clearly the effect of my treatment in lowering such resistivity. Four membranes were made and were treated for different time periods with a chlorosulfonic acid at room temperature. As can be seen from the following table, treatment for a period of 30 minutes increased the conductivity of the cation exchange membrane over tenfold.

*Conditioning heterogeneous polystyrene bonded cation exchange resin*

| Membrane | Initial thickness, mm. | Chemical treatment | Storage | Results | Final thickness, mm. | Resistivity, ohm-cms. |
|---|---|---|---|---|---|---|
| I | 1.48 | 1¾ mins. in chlorosulphonic acid at 25° C | 48 hrs. in distilled water. | Slight surface peeling | 1.62 | 41,000 |
| II | 1.55 | 10 mins. in chlorosulphonic acid at 25° C | do | Heavier peeling | 1.58 | 40,000 |
| III | 1.58 | 30 mins. in chlorosulphonic acid at 25° C | do | Very heavy peeling | 1.48 | 8,000 |
| IV | 1.55 | None | do | No peeling | 1.71 | 113,400 |

In another example, an anion-exchange resin in powdered form is mixed with 30 percent by weight of powdered polystyrene. Membranes are again formed in the manner described in U. S. Patent 2,614,976. A high resistance anion-exchange membrane is formed and the conductivity of the membrane is increased by treating the membrane under reflux at atmospheric pressure for 30 minutes with a mixture of 20 parts of nitric acid and 30 parts of sulfuric acid. The membrane is then washed with water, air dried and reduced with 23 parts of stannous chloride in 100 parts of hydrochloric acid. Reduction is carried out under reflux conditions at atmospheric pressure. The membrane is then washed with sodium hydroxide. An improved anion-exchange membrane of increased electrical conductivity resulting from amine ion-exchange groups having been imposed on the surface of the polystyrene is obtained. These amine groups provide a path for the transfer of anions from electrolytes through the anion-exchange resins hitherto blocked by the inert bonding polystyrene.

The improved bonded heterogeneous ion-exchange membranes of increased conductivity provided by my invention greatly increases the utility of ion-exchange membranes particularly in large scale electrodialysis processes. The substantial reduction in resistance of the membranes which may be from 5 to as high as 50 fold reduces the size of membranes that is required to provide sufficient ion transfer and reduces power losses in electrodialytic processes. The larger membranes are more susceptible to wear and can now be replaced by improved membranes of smaller area, and consequently greater strength, but equal capacity.

Having described my invention, I claim:

1. A method comprising treating the external surfaces and the internal, ion-exchange material-binder interfaces of a heterogeneous ion-exchange membrane that has substantial thickness and physical strength and that comprises a finely divided, water-insoluble, porous ion-exchange material substantially uniformly distributed throughout an electrolytically inert, organic bonding matrix formed of a polymerized resin derived from a monomeric material having the general molecular structure $CH_2=C<$, said resin containing a plurality of recurring phenyl substituents, the opposing surfaces of said membrane being conductively connected through a plurality of mutually contacting particles of the ion-exchange material disposed therebetween, said treating being selected from the group consisting of (a) sulfonating, (b) haloalkylating and aminating the haloalkylated product, and (c) nitrating and reducing the nitrated product, said treating being effective to penetrate the pores of the ion-exchange material and effective chemically to convert the recurring substituents of the portions of the polymerized resin that form the external surfaces of the bonding resin and that form the interfaces between the bonding matrix and the ion-exchange material and that are contacted during said treating, to like functional groups selected from the group consisting of (a) sulfonic, (b) quaternary ammonium, and (c) substituted ammonium groups, said functional groups having associated therewith dissociable ions, having the same ionic sign as the dissociable ions of said ion-exchange material, and terminating said treating before the membrane has been substantially weakened thereby.

2. The process of claim 1 where said treating is carried out for between about 1¾ minutes and about 40 minutes.

3. A method comprising treating the external surfaces and the internal, ion-exchange material-binder interfaces of a heterogeneous ion-exchange membrane that has substantial thickness and physical strength and that comprises a finely divided, water-insoluble, porous cation exchange material substantially uniformly distributed throughout an electrolytically inert polystyrene bonding matrix, the opposing surfaces of said membrane being conductively connected through a plurality of mutually contacting particles of said cation exchange material disposed therebetween, said treating being effected by contacting the membrane with a sulfonating agent under sulfonating conditions for between about 1¾ minutes and about 30 minutes, said treating being effective to penetrate the pores of the cation-exchange material and effective chemically to convert the recurring substituents of the portions of the polystyrene that form the external surfaces and that form the interfaces of the bonding matrix and the cation-exchange material and that are contacted during said treating, to sulfonic groups having dissociable hydrogen ions associated therewith, and terminating said treating before the membrane has been substantially weakened thereby.

4. A method comprising treating the external surfaces and the internal, ion-exchange material-binder interfaces of a heterogeneous ion-exchange membrane that has substantial thickness and physical strength and that comprises a finely divided, water-insoluble, porous anion exchange material substantially uniformly distributed throughout an electrolytically inert polystyrene bonding matrix, the opposing surfaces of said membrane being conductively connected through a plurality of mutually contacting particles of said anion exchange material disposed therebetween, said treating being effected by contacting the membrane for not substantially more than about 30 minutes with a nitrating agent containing nitric acid under nitrating conditions to impose nitro groups on the treated surfaces of the polystyrene matrix, and by subjecting the thus treated membrane to a reducing agent under reducing conditions to reduce the nitro groups to amino groups, said treating being effective to penetrate the pores of the anion-exchange material and effective chemically to convert the recurring substituents of the portions of the polystyrene matrix that form the external surfaces and that form the interfaces between the polystyrene matrix and the anion-exchange material and that are contacted during said treating, to substituted ammonium groups, having associated therewith dissociable anions, and terminating said treating before the membrane has been substantially weakened thereby.

5. A heterogeneous ion-exchange membrane comprising a finely divided, water-insoluble, porous ion-exchange material substantially uniformly distributed throughout a bonding matrix formed of a polymerized resin derived from a monomeric material having the formula $CH_2=C<$, the internal, non-interfacial portions of said resin being characterized substantially entirely by recurring, unsubstituted phenyl substituents, but a substantial proportion of the recurring substituent groups at the external surfaces of the membrane, and at the interfaces between the ion-exchange material and the bonding resin being selected from the group consisting of (a) sulfonic, (b) quaternary ammonium, and (c) substituted ammonium groups, said recurring substituent groups of the external surficial and interfacial portions of the polymerized resin also having associated therewith dissociable ions, having the same ionic sign as the dissociable ions of said ion-exchange material, said membrane having substantial thickness and physical strength, the opposing surfaces of said membrane being conductively connected through a plurality of mutually contacting particles of said ion-exchange material disposed therebetween, said membrane being characterized by electrolytically conductive interfaces between the bonding resin and the ion-exchange material and by a visibly perceptible roughness of the external surfaces.

6. A heterogeneous ion-exchange membrane comprising a finely divided, water-insoluble porous cation-exchange material substantially uniformly distributed throughout a bonding matrix formed of a polymerized resin derived from a monomeric material having the formula $CH_2=C<$, the internal, non-interfacial portions of said resin being characterized substantially entirely by recurring, unsubstituted phenyl substituents, but a substantial proportion of the recurring substituent groups at the external surfaces of the membrane and at the interfaces between the cation-exchange material and the bonding resin being sulfonic groups, said recurring substituent groups of the external surficial and interfacial portions of the polymerized resin also having associated therewith dissociable ions having the same ionic sign as the dissociable ions of said cation-exchange material, said membrane having substantial thickness and physical strength, and the opposing external surfaces of said membrane being conductively connected through a plurality of mutually contacting particles of said cation-exchange material disposed therebetween, said membrane being further characterized by electrolytically conductive interfaces between the cation-exchange material and the bonding resin and also by visibly perceptible roughness of the external surfaces of the membrane.

7. A heterogeneous ion-exchange membrane comprising a finely divided, water-insoluble porous cation-exchange material substantially uniformly distributed throughout a bonding matrix formed of a polymerized resin derived from a monomeric material having the formula $CH_2=C<$, the internal, non-interfacial portions of said resin being characterized substantially entirely by recurring esterified carboxyl groups, but a substantial portion of the resinous substituents at the external surfaces of the membrane and at the interfaces between the anion-exchange material and the bonding resin being resinous acyloxy groups, said acyloxy groups of the external surficial and interfacial portions of the polymerized resin also having associated therewith dissociable cations, said membrane having substantial thickness and physical strength, and the opposing external surfaces of said membrane being conductively connected through a plurality of mutually contacting particles of said anion-exchange material disposed therebetween, said membrane being further characterized by electrolytically conductive interfaces between the anion-exchange material and the bonding resin and also by visibly perceptible roughness of the external surfaces of the membrane.

8. A heterogeneous ion-exchange membrane comprising a finely divided, water-insoluble porous anion-exchange material substantially uniformly distributed throughout a bonding matrix formed of a polymerized resin derived from a monomeric material having the formula $CH_2=C<$, the internal, non-interfacial portions of said resin being characterized substantially entirely by recurring, unsubstituted phenyl substituents, but a substantial proportion of the substituent groups at the external surfaces of the membrane and at the interfaces between the anion-exchange material and the bonding resin having amino groups chemically imposed thereon, said membrane having substantial thickness and physical strength, and the opposing external surfaces of said membrane being conductively connected through a plurality of mutually contacting particles of said anion-exchange material disposed therebetween, said membrane being further characterized by electrolytically conductive interfaces between the anion-exchange material and the bonding resin and also by visibly perceptible roughness of the external surfaces of the membrane.

9. A method comprising treating the external surfaces and the internal, ion-exchange material-binder interfaces of a heterogeneous ion-exchange membrane that has substantial thickness and physical strength and that comprises a finely divided, water-insoluble porous cation-exchange material substantially uniformly distributed throughout an electrolytically inert, organic bonding matrix formed of a polymerized resin derived from a monomeric material having the general molecular structure $CH_2=C<$, said resin containing a plurality of recurring esterified carboxyl radicals, the opposing surfaces of said membrane being conductively connected through a plurality of mutually contacted particles of the ion-exchange material disposed therebetween, said treating comprising hydrolysis with an alkali metal base and being effective to penetrate the pores of the ion-exchange material and effective chemically to convert the resinous esterified carboxyl groups of the portions of the polymerized resin at the external surfaces of the membrane and at the interfaces between the bonding resin and the ion-exchange material, and that are contacted during said treating, to resinous acyloxy groups having associated therewith dissociable cations, and terminating said treating before the membrane has been substantially weakened thereby.

References Cited in the file of this patent

UNITED STATES PATENTS

| | | |
|---|---|---|
| 2,510,262 | Sollner et al. | June 6, 1950 |
| 2,531,863 | Scott et al. | Nov. 28, 1950 |
| 2,591,574 | McBurney | Apr. 1, 1953 |
| 2,636,851 | Juda et al. | Apr. 28, 1953 |
| 2,681,319 | Bodamer | June 15, 1954 |

U. S. DEPARTMENT OF COMMERCE
PATENT OFFICE

CERTIFICATE OF CORRECTION

January 21, 1958

Patent No. 2,820,756

Malcolm R. J. Wyllie

It is hereby certified that error appears in the printed specification of the above numbered patent requiring correction and that the said Letters Patent should read as corrected below.

Column 8, lines 9 and 10, 17 and 0, for "anion-exchange", each occurrence, read --cation-exchange--.

Signed and sealed this 1st day of April 1958.

(SEAL)
Attest:
KARL H. AXLINE
Attesting Officer

ROBERT C. WATSON
Commissioner of Patents